United States Patent
Bookheimer et al.

(10) Patent No.: US 10,399,150 B2
(45) Date of Patent: Sep. 3, 2019

(54) SEALED COLLET

(71) Applicant: Kennametal Inc., Latrobe, PA (US)

(72) Inventors: Alan J. Bookheimer, Latrobe, PA (US); Ruy Frota de Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/614,401

(22) Filed: Jun. 5, 2017

(65) Prior Publication Data

US 2018/0347701 A1    Dec. 6, 2018

(51) Int. Cl.
*B23B 31/20*    (2006.01)

(52) U.S. Cl.
CPC .... *B23B 31/202* (2013.01); *B23B 2231/2008* (2013.01); *B23B 2231/2075* (2013.01); *B23B 2231/2091* (2013.01); *B23B 2231/2094* (2013.01); *B23B 2231/2097* (2013.01); *B23B 2231/24* (2013.01); *B23B 2250/12* (2013.01);
(Continued)

(58) Field of Classification Search
CPC ..... Y10T 279/17111; Y10T 279/17299; Y10T 279/17316; Y10T 279/17411; Y10T 279/17418; Y10T 279/17538; Y10T 279/117435; B23B 31/20; B23B 31/202; B23B 2231/20; B23B 2231/2008; B23B 2231/2072; B23B 2231/2075; B23B 2231/2089; B23B 2231/2091;
(Continued)

(56) References Cited

U.S. PATENT DOCUMENTS 2,282,676 A * 5/1942 Pigott .................. B23B 31/202
279/51
3,385,606 A    5/1968 Benjamin et al.
(Continued)

FOREIGN PATENT DOCUMENTS

DE    102011052747 A1 *  2/2013  ........... B23B 31/202
FR       2442683 A1 *  6/1980  ........... B23B 31/023
(Continued)

OTHER PUBLICATIONS

Machine translation, DE 102011052747A1, Schoener, W., Feb. 21, 2013.*

*Primary Examiner* — Eric A Gates
*Assistant Examiner* — Chwen-Wei Su
(74) *Attorney, Agent, or Firm* — Matthew S. Bedsole (57) ABSTRACT

A collet includes an axially rearward end and an axially forward end; a nose portion; a body portion having an outer surface and an inner surface for engaging a shank of a tool; a plurality of slots extending from the inner surface to the outer surface; and a plurality of coolant channels disposed within the collet between the plurality of longitudinally extending slots and extending entirely from the axially rearward end to the axially forward end of the collet. The slots include a first slot extending from the axial forward end to within an intermediary zone, a second slot extending from the axial rearward end to at least the tool holder engagement zone such that the second slot does not intersect the first slot, and a third slot from within the tool engagement zone to within the intermediary zone such that the third slot circumferentially overlaps the first and second slots.

18 Claims, 6 Drawing Sheets

(52) U.S. Cl.
CPC ............... *Y10T 279/17111* (2015.01); *Y10T 279/17299* (2015.01); *Y10T 279/17435* (2015.01); *Y10T 279/17538* (2015.01)

(58) Field of Classification Search
CPC .... B23B 2231/2094; B23B 2231/2097; B23B 2231/24; B23B 2250/12
See application file for complete search history.

(56) References Cited

U.S. PATENT DOCUMENTS

| | | |
|---|---|---|
| 3,905,609 A | 9/1975 | Sussman |
| 5,156,220 A | 10/1992 | Forehand et al. |
| 5,904,451 A * | 5/1999 | Gerber .................... B23B 31/00 279/20 |
| 5,911,421 A | 6/1999 | Steele |
| 6,729,627 B2 | 5/2004 | Komine et al. |
| 7,306,238 B2 | 12/2007 | Oshnock et al. |
| 8,747,033 B2 | 6/2014 | Jenkins |
| 9,022,393 B2 | 5/2015 | Guy |
| 2006/0284385 A1* | 12/2006 | Chen ..................... B23B 31/202 279/20 |
| 2011/0158759 A1 | 6/2011 | Jansen et al. |
| 2014/0353931 A1* | 12/2014 | Frota de Souza Filho .................. B23B 31/204 279/4.07 |
| 2015/0042050 A1 | 2/2015 | Haimer et al. |
| 2015/0283627 A1* | 10/2015 | Borapura .............. B23B 31/305 279/20 |
| 2016/0221086 A1* | 8/2016 | Haimer ............... B23B 31/1177 |
| 2017/0341158 A1* | 11/2017 | Chen ................... B23B 31/102 |
| 2018/0009041 A1* | 1/2018 | Chen ....................... B23B 31/20 |

FOREIGN PATENT DOCUMENTS

| | | | |
|---|---|---|---|
| GB | 816271 A | 7/1959 | |
| WO | WO 2010017969 A1 * | 2/2010 | ......... B23B 31/1177 |
| WO | WO 2010062850 A1 * | 6/2010 | ......... B23Q 11/1023 |

* cited by examiner

SEALED COLLET

FIELD OF THE INVENTION

The present invention relates to chucks and sockets and, more particularly, to a collet for use with machine tools. Most particularly, the invention relates to a collet having slots and coolant holes.

BACKGROUND OF THE INVENTION

Collets for use in tool-holding chuck assemblies are well known. Such collets generally comprise a tubular body formed from a plurality of elongated, flexible steel fingers. The fingers are separated by longitudinal collet saw slots that impart some degree of radial flexibility to the collet, which allows the collet to selectively grip the shank of a cutting tool, such as a drill bit. Adjacent gripping fingers are interconnected by an alternating pattern of metal webs to form a one-piece collet body. In operation, the collet body is inserted in a complementary-shaped opening in a chuck shaft so that a distal end of the collet body projects out of the shaft. An annular lock nut having an inner diameter screw thread that matches an outer diameter screw thread on the shaft is then installed over the shaft and distal end of the collet body. The lock nut has a nose ring with a frustoconical cam surface that engages the distal end of the collet body and squeezes it radially inwardly as the lock nut is screwed onto the chuck shaft. The radial compression that the lock nut applies to the distal end of the collet body flexes the body inwardly, creating a gripping force between the inner diameter of the collet body and a tool shank inserted therein.

Currently, sealed collets, also known as bonded collets, must have the slots filled with a rubber bonding compound or use an additional component to seal the collet. Without a bonded collet, the coolant flows through the collet and collet nut. Unfortunately, with a bonded collet, coolant can only flow through the tool.

Thus, there is a need for an improved collet that does not require the slots to be filled with a sealant while preventing coolant to flow through the collet and collet nut.

SUMMARY OF THE INVENTION

The problem of sealed collets with slots filled with a sealant is solved by providing a plurality of divided slots in such a way that coolant does not have a path to flow through from the back to the front of the collet, while providing coolant holes between the slots to allow coolant to be directed through the collet to the cutting tool.

In one aspect of the invention, a collet having a rotational axis, said collet comprising an axially rearward end and an axially forward end, a nose portion, a body portion having an outer surface formed at a taper angle with respect to the rotational axis for engaging a chuck of a tool holder, and an inner surface for engaging a shank of a tool, a plurality of slots extending from the inner surface to the outer surface, and a plurality of coolant channels disposed within the collet between the plurality of longitudinally extending slots and extending entirely from the axially rearward end to the axially forward end of the collet. The collet defines a shank engagement zone extending from the axially forward end. The collet further defines a tool holder engagement zone extending from the axially rearward end. The shank engagement zone overlaps the tool holder engagement zone to define an intermediary zone. The plurality of longitudinally extending slots comprises at least one first slot extending a first length from the axial forward end to within the intermediary zone, at least one second slot extending a second length from the axial rearward end to at least the tool holder engagement zone such that the at least one second slot does not intersect the at least one first slot, and at least one third slot extending a third length from within the tool engagement zone to within the intermediary zone such that the at least one third slot circumferentially overlaps the at least one first slot and the at least one second slot, and wherein the first length, the second length, and the third length are less than a total length of the collet.

In another aspect of the invention, a tool assembly, comprises a tool holder having a chuck with a recess; and a collet at least partially disposed in the recess, the collet having a rotational axis. The collet comprising an axially rearward end and an axially forward end, a nose portion, a body portion having an outer surface formed at a taper angle with respect to the rotational axis for engaging a chuck of a tool holder, and an inner surface for engaging a shank of a tool, a plurality of slots extending from the inner surface to the outer surface, and a plurality of coolant channels disposed within the collet between the plurality of longitudinally extending slots and extending entirely from the axially rearward end to the axially forward end of the collet. The collet defines a shank engagement zone extending from the axially forward end. The collet further defines a tool holder engagement zone extending from the axially rearward end. The shank engagement zone overlaps the tool holder engagement zone to define an intermediary zone. The plurality of longitudinally extending slots comprises at least one first slot extending a first length from the axial forward end to within the intermediary zone, at least one second slot extending a second length from the axial rearward end to within the engagement zone such that the at least one second slot does not intersect the at least one first slot, and at least one third slot extending a third length from within the tool engagement zone to within the intermediary zone such that the at least one third slot circumferentially overlaps the at least one first slot and the at least one second slot, and wherein the first length, the second length, and the third length are less than a total length of the collet.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
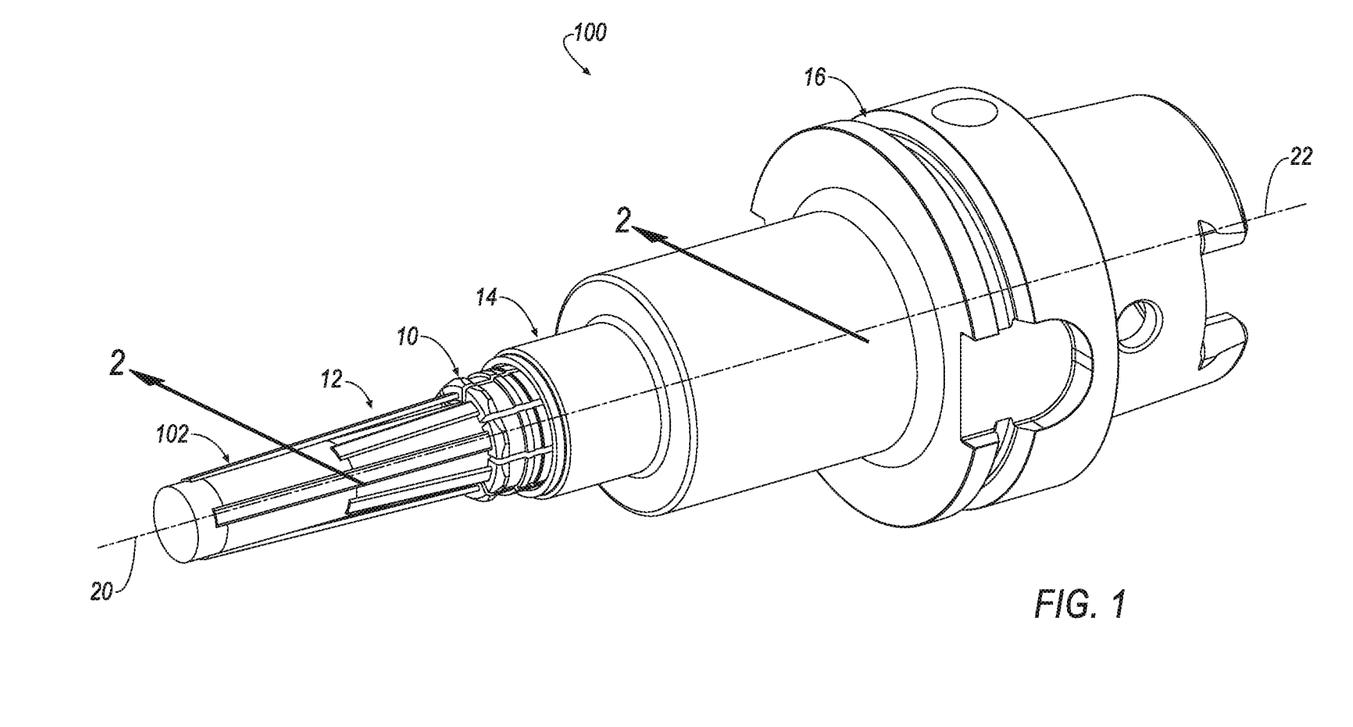
FIG. 1 is a front isometric view of a tool system including a collet mounted in a tool holder according to an embodiment of the invention.
Figure 2:
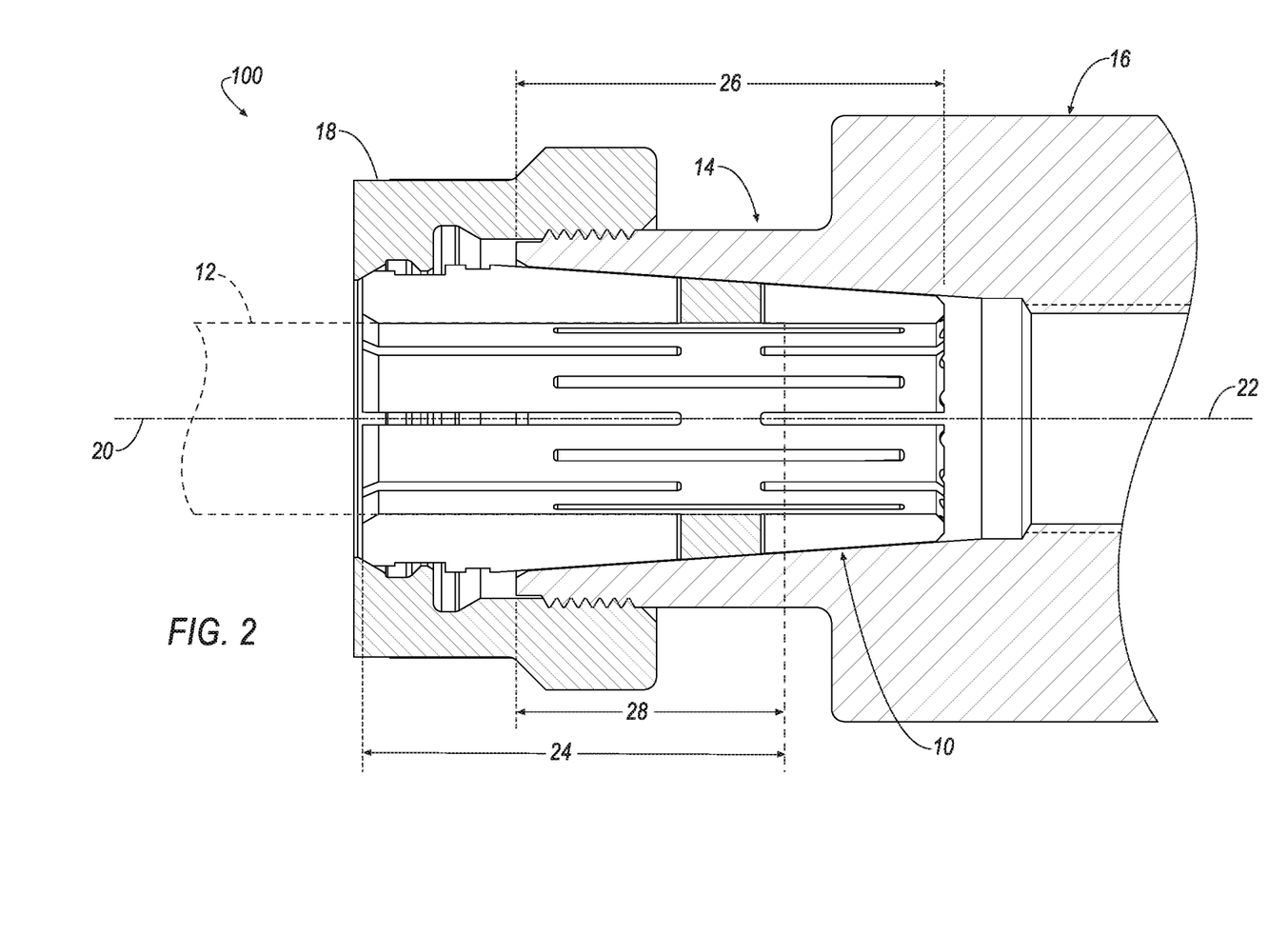
FIG. 2 is an enlarged cross-sectional view of the collet when mounted in the tool holder taken along line 2-2 in FIG. 1.

With reference now to the drawings, wherein like numerals designate like components throughout all the several figures, there is illustrated in FIGS. 1 and 2 a sealed collet, shown generally at 10, mounted in a tool holder of a tool system, shown generally at 100, according to an embodiment of the invention. In general, the collet 10 is adapted to receive a shank 12 of a cutting tool (not completely shown in FIG. 1), while the collet 10 is adapted to be mounted to a chuck 14 of a tool holder, shown generally at 16. The collet 10 is secured to the tool holder 16 by a lock nut 18. When the shank 12 of the cutting tool is properly mounted to the tool holder 16 by the collet 10, a centerline 20 of the shank 12 is substantially aligned with a centerline 22 of the tool holder 16. The collet 10, the chuck 14, the tool holder 16 and the lock nut 18 comprise a tool system 100.

Referring to FIG. 2, the portion of collet 10 in which the shank 12 is disposed within the collet 10 is defined as the shank engagement zone 24. Similarly, the portion of the collet 10 in which the tool holder 16 engages the collet 10 is defined as the tool holder engagement zone 26. The shank engagement zone 24 should be as long as possible, but no less than the diameter of the shank 12 and must extend into the tool holder engagement zone 26. The shank engagement zone 24 could be the entire length of the collet 10. An intermediary zone 28 is defined as the overlap between the shank engagement zone 24 and the tool holder engagement zone 26.

Figure 3:
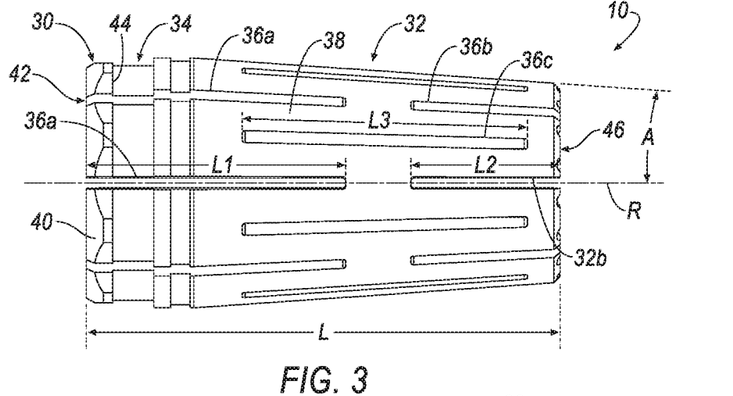
FIG. 3 is a side elevational view of the collet showing a plurality of slots according to an embodiment of the invention.
Figure 4:
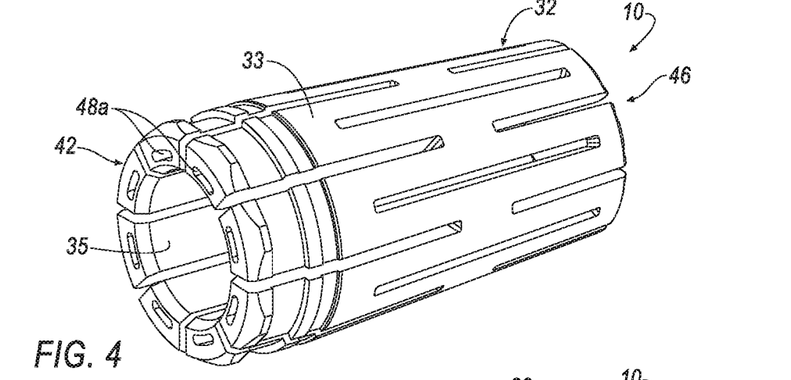
FIG. 4 is a front isometric view of the collet shown in FIG. 3.
Figure 5:
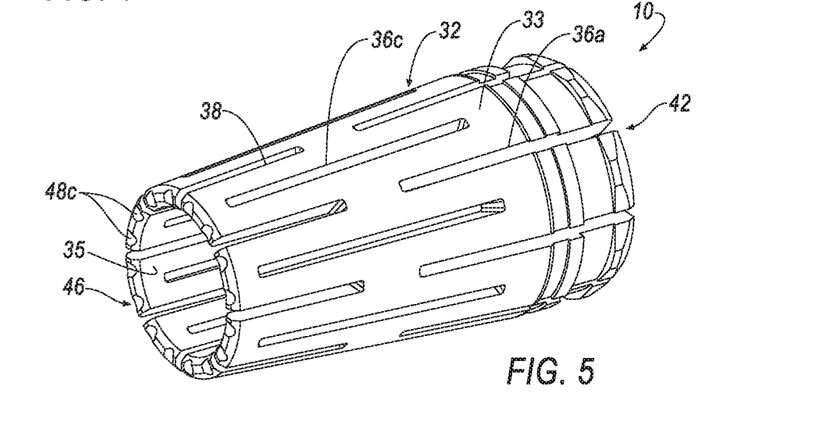
FIG. 5 is a rear isometric view of the collet shown in FIG. 3.

Referring now to FIGS. 3-7, the collet 10 is shown according to an embodiment of the invention. In general, the collet 10 is made from a resilient steel alloy and generally comprises a nose portion 30 and a body portion 32 separated by an annular recess or groove 34. In the illustrated embodiment, the collet 10 includes an array of slots 36 extending parallel to an axis of rotation, R, of the collet 10 (and substantially parallel to each other). The array of slots 36 are separated by webs or gripping fingers 38. The slots 36 extend entirely through the nose portion 30 and the body portion 32 of the collet 10. In other words, each slot 36a, 36b, 36c extends radially inward from an outer surface 33 to an inner surface 35 of the collet 10. The presence of the slots 36 allow the collet 10 to be radially collapsed by the lock nut 18 to grip the shank 12 of the cutting tool. As seen in FIG. 3, the outer surface 33 of the collet 10 is formed at a taper angle, TA, with respect to the rotational axis R of the collet 10.

One aspect of the invention is that the slots 36 comprise at least one first slot 36a extending from an axially forward end 42 of the collet 10 axially rearward a first length, L1, to within the intermediary zone 28 (see FIG. 2). The slots 36 further comprise at least one second slot 36b extending from an axially rearward end 46 of the collet 10 axially forward a second length, L2, to at least the tool holder engagement zone 26 (see FIG. 2). It should be noted that, if the second slot 36b lies in the same plane as the first slot 36a, then the second slot 36b does not intersect with the first slot 36a. However, it is envisioned that the second slot 36b can lie in a different plane than the first slot 36a and can overlap the first slot 36a, so long as the second slot 36b does not intersect the first slot 36a. The slots 36 further comprise at least one third slot 36c extending a third length, L3, such that the at least one third slot 36c circumferentially overlaps the first and second slots 36a, 36b. In addition, the at least one third slot 36c must have a forward or rearward end, or both, within the intermediary zone 28. In this arrangement of the first, second and third slots 36a, 36b, 36c, the collet 10 comprises a sealed collet that does not allow coolant to leak through the slots 36.

As seen in FIG. 3, the lengths L1, L2 and L3 are less than the total length, L, of the collet 10. In the illustrated embodiment, the collet 10 has a total of eight first slots 36a, eight second slots 36b and eight third slots 36c. However, it will be appreciated that the invention is not limited by the number of slots 36, and that the invention can be practiced with any desirable number of slots 36, depending on the circumference of the outer surface 33 of the collet 10 and other design considerations.

The outside surface of the nose portion 30 of the collet 12 includes an angled surface 40 that extends from an axially forward end 42 of the collet 10. Specifically, the angled surface 40 tapers radially inward proximate the annular groove 34 to the axially forward end 42 of the collet 10. A ledge 44 is provided axially rearward of the angled surface 40 to facilitate the removal of the collet 10 from the tool holder 16 via the lock nut 18. The body portion 32 of the collet 10 is generally frustoconical in shape and tapers inwardly from the annular recess 34 to the axially rearward end 46.

Figure 6:
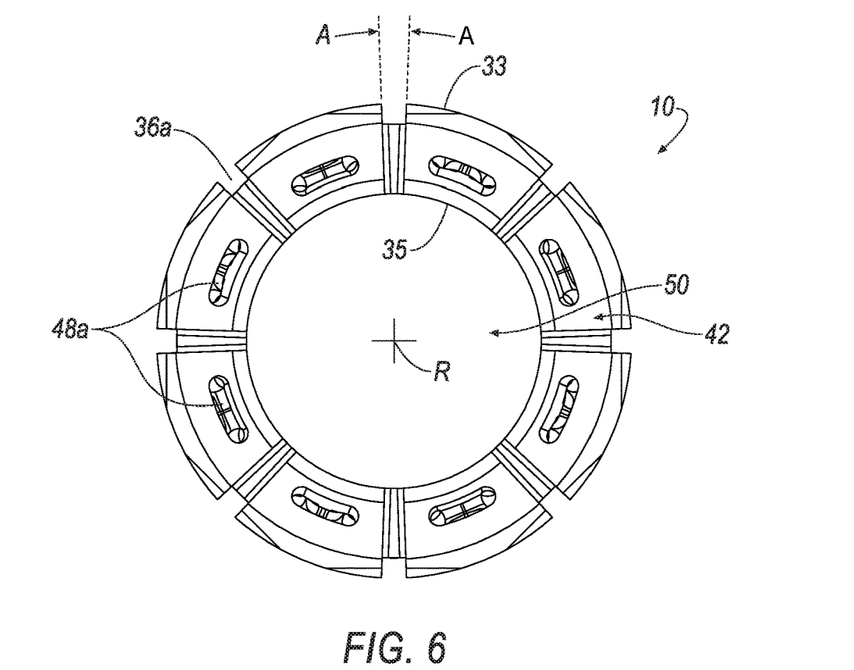
FIG. 6 is a front view of the collet shown in FIG. 3.

As seen in FIG. 6, the collet 10 further includes a cylindrically-shaped passageway 50 that is concentrically provided along the axis of rotation, R, of the collet 10 for receiving the shank 12 of the cutting tool, which may be, for example, a drill bit, or the like.

Figure 7:
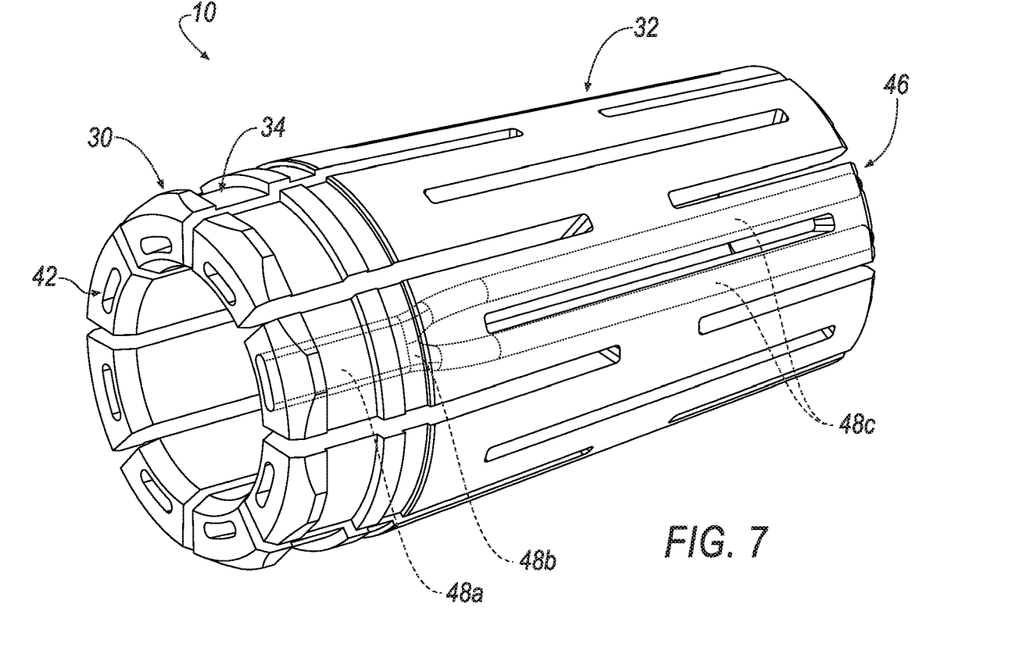
FIG. 7 is a front isometric phantom view of the collet shown in FIG. 3 showing a plurality of coolant holes according to an embodiment of the invention.
Figure 8:
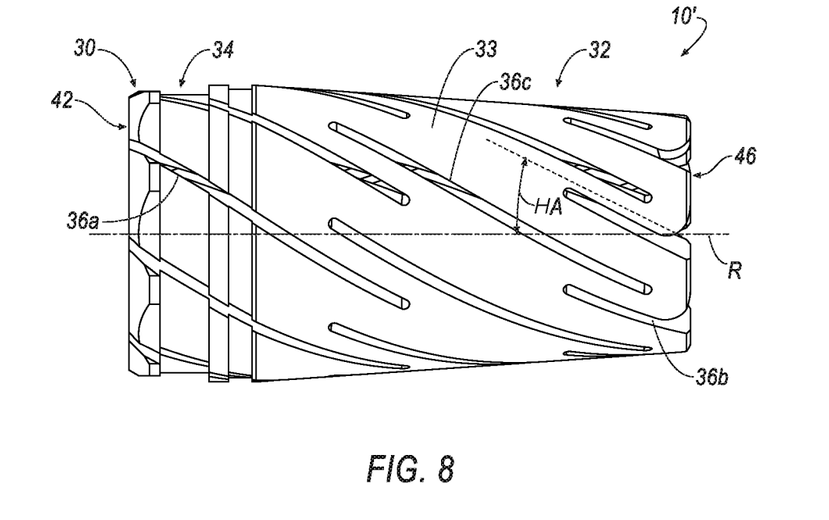
FIG. 8 is a side elevational view of the collet showing a plurality of slots according to another embodiment of the invention.
Figure 9:
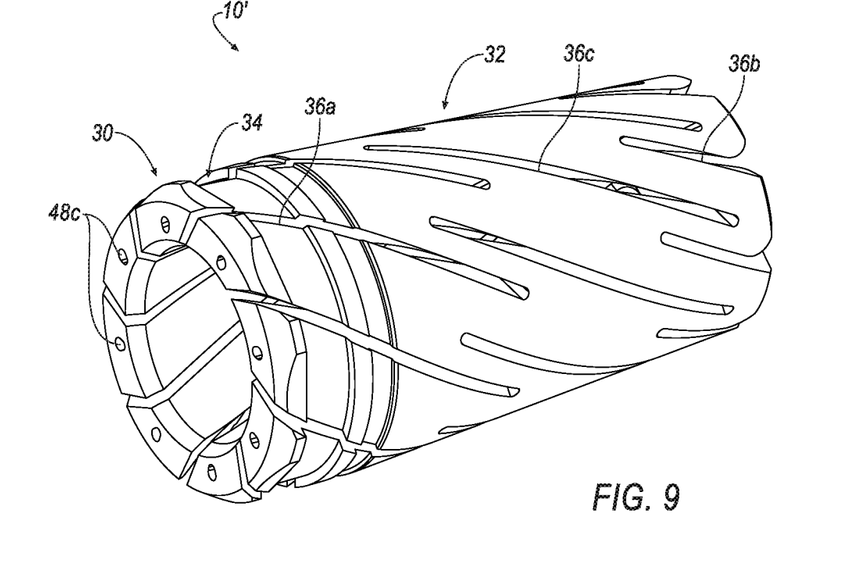
FIG. 9 is a front isometric view of the collet shown in FIG. 8.
Figure 10:
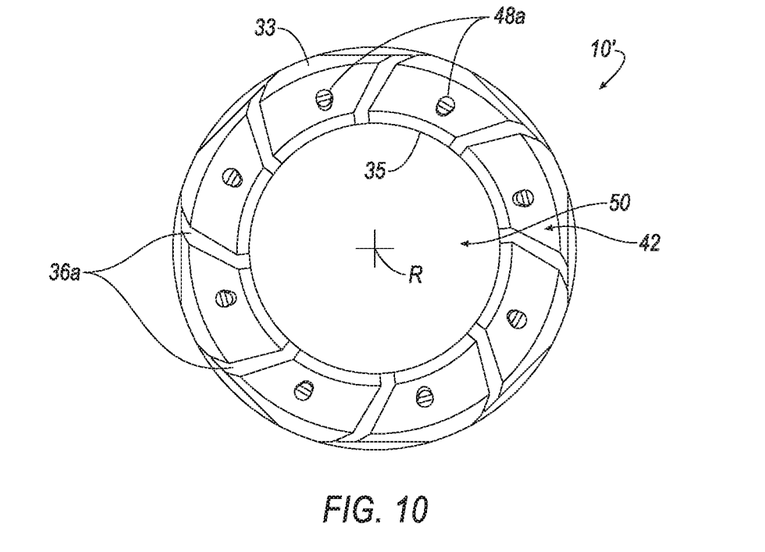
FIG. 10 is a front view of the collet shown in FIG. 8.

Another aspect of the invention is that the collet 10 includes a plurality of coolant channels 48 disposed within the collet 10 between the plurality of longitudinally extending slots 36 and extending uninterruptedly from the axially rearward end 46 to the axially forward end 42 of the collet 10. The coolant channels 48 enable coolant to flow into the axially rearward end 46, through the body portion 32 and the nose portion 30 of the collet 10, and exit the axially forward end 42 of the collet such that coolant is directed at multiple locations along the tool 102 (see FIG. 1). To accomplish this, each coolant channel 48 comprises a nozzle portion 48a, a header portion 48b and a plurality of feeder portions 48c. In the illustrated embodiment, the feeder portions 48c extend from the axially rearward end 46 to the header portion 48b proximate the groove or recess 34. Specifically, the feeder portions 48c extend axially forward of the at least one second slot 36b and the at least one third slot 36c and are axially rearward of the nozzle portion 48a and the header portion 48b. In the illustrated embodiment, the coolant channels 48 are substantially straight (i.e. parallel to the rotation axis, R) such that the coolant channels 48 do not intersect the slots 36, as shown in FIG. 7.

In the illustrated embodiment, a pair of feeder portions 48c are in fluid communication with a corresponding nozzle portion 48a and header portion 48b. Thus, the feeder portions 48c are greater in number than the nozzle portions 48a and header portions 48b. For example, there are twice as many feeder portions 48c than nozzle portions 48a and header portions 48b. A greater number of feeder portions 48c are desirable because the feeder portions 48c allow for maximized coolant flow, while maintaining adequate strength and flexibility. In the illustrated embodiment, the collet 10 has sixteen feeder portions 48c and eight nozzle portions 48a and header portions 48b. However, it will be appreciated that the invention is not limited by the number of nozzle portions 48a, header portions 48b and feeder portions 48c, and that the invention can be practiced with any desirable number, so long as the coolant holes 48 do not intersect the slots 36.

In addition, the walls of the slots 36 need not be parallel to each other and can be made angled or wedge-shaped to maximize the area between the slots 36 and allow for more available space for the coolant holes 48. For example, the slots 36 can be angled radially outward at an angle, A, such that a gap between the walls are closest to each other at the inner surface 35 and gradually becomes larger from the inner surface 35 to the outer surface 33, as shown in FIG. 6.

In the illustrated embodiment, the feeder portions 48c have a substantially circular cross-sectional shape, and the nozzle portion 48a and the header portion 48b have a substantially non-circular cross-sectional shape to increase the flow area and flow rate of coolant through the collet 10. However, it will be appreciated that the invention is not limited by the cross-sectional shape of the coolant channels 48, and that the invention can be practiced with any desirable cross-sectional shape for the coolant holes 48.

It will be appreciated that the invention is not limited by the slots 36 and the coolant channels 48 being substantially straight (i.e. parallel with respect to the rotational axis, R), and that the invention can be practiced with the slots 36 having any desirable shape. As shown in FIGS. 8-11, a collet 10' is substantially identical to the collet 10, except that slots 36 and the coolant holes 48 are substantially helically disposed about the rotational axis, R, rather than substantially straight as in the collet 10. This helical arrangement allows a greater range of collapse with the same slot width, as compared to the earlier embodiment with substantially straight slots. The helix angle, HA, should generally be less than 30 degrees. In addition, the collet 10' does not have a header portion 48b, so the number of feeder portions 48c are equal to the number of nozzle portions 48a. In the illustrated embodiment, the collet 10' has a total of eight nozzle portions 48a and eight feeder portions 48c. However, it will be appreciated that the invention can be practiced with any desirable number of nozzle portions 48a and feeder portions 48c, so long and the coolant holes 48 do not intersect the slots 36.

Figure 11:
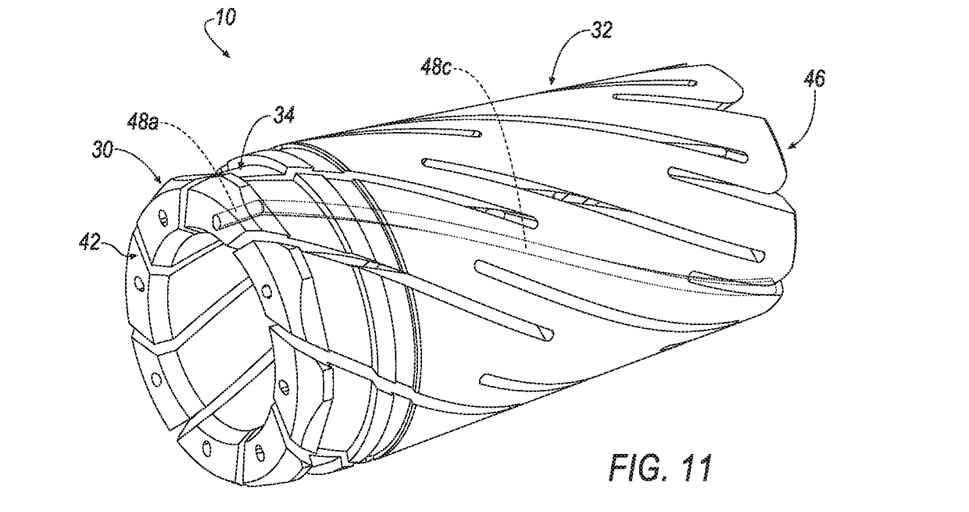
FIG. 11 is a front isometric phantom view of the collet shown in FIG. 8 showing a plurality of coolant holes according to another embodiment of the invention.

As seen in FIG. 11, the feeder portions 48c are substantially helical, while the nozzle portions 48a proximate the nose portion 30 are substantially straight (and parallel to the rotation axis, R). As shown in the illustrated embodiment, the feed portions 48c and the nozzle portions 48a are substantially non-circular in cross-sectional shape. However, it will be appreciated that the invention is not limited by the cross-sectional shape of the coolant holes 48, and that the invention can be practiced with coolant holes having any desirable cross-sectional shape, such as circular, polygonal, and the like.

As described above, a collet of the invention includes a plurality of slots arranged to prevent coolant to leak through the slots, thereby providing a sealed collet. In addition, the collet of the invention has a plurality of coolant holes disposed within the collet to allow coolant to flow through an interior of the collet and be directed to specific locations on the tool.

The patents and publications referred to herein are hereby incorporated by reference.

Having described presently preferred embodiments the invention may be otherwise embodied within the scope of the appended claims.

What is claimed is:

1. A collet having a rotational axis, said collet comprising:
an axially rearward end and an axially forward end;
a nose portion;
a body portion having an outer surface formed at a taper angle with respect to the rotational axis for engaging a chuck of a tool holder, and an inner surface for engaging a shank of a tool;
a plurality of longitudinally extending slots extending from the inner surface to the outer surface; and
a plurality of coolant channels disposed within the collet between the plurality of longitudinally extending slots and extending entirely from the axially rearward end to the axially forward end of the collet,
wherein the collet defines a shank engagement zone extending from the axially forward end, and wherein the collet further defines a tool holder engagement zone extending from the axially rearward end, and wherein the shank engagement zone overlaps the tool holder engagement zone to define an intermediary zone, and
wherein the plurality of longitudinally extending slots comprises at least one first slot extending a first length from the axial forward end to within the intermediary zone, at least one second slot extending a second length from the axial rearward end to at least the tool holder engagement zone such that the at least one second slot does not intersect the at least one first slot, and at least one third slot extending a third length from within the tool holder engagement zone to within the intermediary zone such that the at least one third slot circumferentially overlaps the at least one first slot and the at least one second slot, and wherein the first length, the second length, and the third length are less than a total length of the collet; and
wherein the at least one first slot and the at least one second slot lie in the same axially-extending plane.

2. The collet of claim 1, wherein the plurality of longitudinally extending slots are substantially parallel to the rotational axis, and wherein the coolant channels are substantially parallel to the rotational axis.

3. The collet of claim 1, wherein at least one of the coolant channels have a feeder portion disposed helically with respect to the rotational axis and a nozzle portion that is substantially straight with respect to the rotational axis.

4. The collet of claim 3, wherein the nozzle portion is axially forward of the feeder portion.

5. The collet of claim 1, wherein the coolantchannels have a substantially circular cross-sectional shape.

6. The collet of claim 1, wherein the coolant channels have a noncircular cross-sectional shape.

7. The collet of claim 1, wherein at least one of the coolant channels comprises a nozzle portion, a header portion and a plurality of feeder portions in fluid communication with the nozzle portion and the header portion, and wherein the feeder portions are axially rearward of the nozzle portion and the header portion.

8. The collet of claim 7, wherein the nozzle portion has a noncircular cross-sectional shape.

9. The collet of claim 7, wherein each of the feeder portions have a substantially circular cross-sectional shape.

10. A tool assembly, comprising:
a tool holder having a chuck with a recess; and
a collet at least partially disposed in the recess, the collet having a rotational axis, said collet comprising:
an axially rearward end and an axially forward end;
a nose portion;
a body portion having an outer surface formed at a taper angle with respect to the rotational axis for engaging a chuck a tool holder, and an inner surface for engaging a shank of a tool;
a plurality of longitudinally extending slots extending from the inner surface to the outer surface; and
a plurality of coolant channels disposed within the collet between the plurality of longitudinally extending slots and extending entirely from the axially rearward end to the axially forward end of the collet,
wherein the collet defines a shank engagement zone extending from the axially forward end, and wherein the collet further defines a tool holder engagement zone extending from the axially rearward end, and wherein the shank engagement zone overlaps the tool holder engagement zone to define an intermediary zone,
wherein the plurality of longitudinally extending slots comprises at least one first slot extending a first length from the axial forward end to within the intermediary zone, at least one second slot extending a second length from the axial rearward end to at least the tool holder engagement zone such that the at least one second slot does not intersect the at least one first slot, and at least one third slot extending a third length from within the tool holder engagement zone to within the intermediary zone such that the at least one third slot circumferentially overlaps the at least one first slot and the at least one second slot, and wherein the first length, the second length, and the third length are less than a total length of the collet; and
wherein the at least one first slot and the at least one second slot lie in the same axially extending plane.

11. The tool assembly of claim 10, wherein the plurality of longitudinally extending slots are substantially parallel to the rotational axis, and wherein the coolant channels are substantially parallel to the rotational axis.

12. The tool assembly of claim 10, wherein at least one of the coolant channels have a feeder portion disposed helically with respect to the rotational axis and a nozzle portion that is substantially straight with respect to the rotational axis.

13. The tool assembly of claim 12, wherein the nozzle portion is axially forward of the feeder portion.

14. The tool assembly of claim 10, wherein the coolant channels have a substantially circular cross-sectional shape.

15. The tool assembly of claim 10, wherein the coolant channels have a non-circular cross-sectional shape.

16. The tool assembly of claim 10, wherein at least one of the coolant channels comprises a nozzle portion, a header portion and a plurality of feeder portions in fluid communication with the nozzle portion and the header portion, and wherein the feeder portions are axially rearward of the nozzle portion and the header portion.

17. The tool assembly of claim 16, wherein the nozzle portion has a non-circular cross-sectional shape.

18. The tool assembly of claim 16, wherein each of the feeder portions have a substantially circular cross-sectional shape.

* * * * *